United States Patent [19]

Hudgin

[11] 3,968,082

[45] July 6, 1976

[54] STABILIZED ETHYLENE-CARBON MONOXIDE COPOLYMERS

[75] Inventor: Donald E. Hudgin, Princeton Junction, N.J.

[73] Assignee: Atlantic Richfield Company, Los Angeles, Calif.

[22] Filed: Sept. 9, 1974

[21] Appl. No.: 504,620

[52] U.S. Cl. .................. 260/45.85 H; 260/45.7 S
[51] Int. Cl.² ..................... C08K 5/36; C08K 5/37
[58] Field of Search ............. 260/45.7 S, 45.85 H, 260/63 CQ

[56] References Cited
UNITED STATES PATENTS

| | | | |
|---|---|---|---|
| 2,495,286 | 1/1950 | Brubaker | 260/63 |
| 2,960,538 | 11/1960 | May et al. | 260/609 |
| 2,967,848 | 1/1961 | Hawkins et al. | 260/41 |
| 3,124,544 | 3/1964 | Proops | 260/2.5 |
| 3,144,422 | 8/1964 | Homberg | 260/23 |
| 3,361,713 | 1/1968 | Meyer et al. | 260/45.85 |
| 3,386,950 | 6/1968 | Horvath et al. | 260/45.7 |
| 3,801,541 | 4/1974 | Hofmann | 260/45.85 |

*Primary Examiner*—Lewis T. Jacobs
*Assistant Examiner*—R. A. White
*Attorney, Agent, or Firm*—Coleman R. Reap

[57] ABSTRACT

Ethylene-carbon monoxide copolymer compositions are stabilized against thermal degradation by the incorporation therein of an organic polythiol compound.

10 Claims, No Drawings

STABILIZED ETHYLENE-CARBON MONOXIDE COPOLYMERS

BACKGROUND OF THE INVENTION

This invention relates to ethylene-carbon monoxide copolymers and more particularly to heat stable ethylene-carbon monoxide copolymer compositions.

Ethylene-carbon monoxide copolymers are of considerable interest because of their potential as engineering plastics. These materials have physical properties which are superior to many other materials commonly used in industry and, in addition, offer the advantage of low cost since carbon monoxide is readily available as a by-product in the manufacture of steel and can also be inexpensively prepared from other chemical processes.

In spite of the advantages offered by ethylene-carbon monoxide copolymers, they have not attained commercial acceptance partly due to the fact that they have poor resistance to thermal degradation during post polymerization processing operations. Since polymeric end products such as films, sheets, and shaped articles are most commonly made by heating and melting polymeric compositions and extruding or injection molding the melt, it is very important that these compositions be able to withstand the temperatures encountered in such post forming operations.

SUMMARY OF THE INVENTION

Ethylene-carbon monoxide copolymer compositions have now been discovered which have greater resistance to thermal degradation. Accordingly, it is an object of the invention to present improved ethylene-carbon monoxide copolymer compositions. It is another object of the invention to present ethylene-carbon monoxide which has improved heat stability. It is another object of the invention to present ethylene-carbon monoxide copolymers which will not undergo serious color degradation during post polymerization processing operations at elevated temperatures. These and other objects of the invention will become more apparent from the description and examples which follow.

In accordance with the present invention, the thermal stability of ethylene-carbon monoxide copolymers is significantly improved by incorporating therein a small amount of an organic polythiol compound free of substituents which would interfere with the desired result. The preferred polythiols are those compounds having the structure

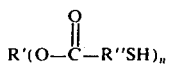

wherein R' and R'' are the same or different hydrocarbon radicals each containing up to 10 carbon atoms and $n$ is at least 2.

DESCRIPTION OF THE INVENTION

The molecular weight and chemical constitution of the ethylene-carbon monoxide copolymers treated in accordance with the invention are not critical and in general, any ethylene-carbon monoxide copolymer can be stabilized by the disclosed stabilizers. The following details are intended to be descriptive and not limitative. The ethylene-carbon monoxide copolymer compositions most improved by the stabilizers of the invention are those having molecular weights in the range of about 500 to 50,000 or more and containing up to 50 weight percent carbon monoxide. The most useful ethylene-carbon monoxide copolymers contain about 1 to 50 weight percent carbon monoxide. As can be readily appreciated, the copolymer compositions may contain additional polymeric components which may be either physically admixed with the ethylene-carbon monoxide copolymer or chemically combined with the ethylene and carbon monoxide as components of the copolymer. Monomers which may be copolymerized with the ethylene and carbon monoxide include ethylenically unsaturated aliphatic or aromatic compounds including olefins, such as propylene, isobutylene, etc.; dienes such as butadiene, isoprene, etc.; acrylic monomers such as acrylic acid, methyl methacrylate, acrylonitrile, etc., aromatic compounds such as styrene, vinyl toluene, etc. The additional polymeric component is usually present in amounts up to about 50% by weight.

The preparation of ethylene-carbon monoxide copolymers is well known and is described in detail in U.S. Patent Nos. 2,495,286; 2,641,590; 3,083,184; 3,530,109; 3,694,412; and 3,689,460.

Organic polythiol compounds which can be used as stabilizers in the present invention are compounds containing at least two mercaptan groups per molecule and which are free of substituents which would interfere with the stabilizing effect of the polythiol compound or otherwise adversely affect the properties of the polymeric product. The most common polythiol compounds contemplated for use in the invention are those compounds having the formula $R(SH)_n$ wherein R is an organic radical containing up to 30 carbon atoms and free of substituents which would adversely affect the properties of the polymeric product. R may be a saturated or ethylenically unsaturated aliphatic or cycloaliphatic radical or it may be an aromatic radical containing up to 3 rings. In the preferred embodiment of the invention R contains up to 18 carbon atoms. Particularly preferred polythiol compounds are the polythiol acid esters having the structural formula

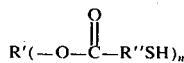

where R' and R'' are the same or different hydrocarbon radicals each containing up to 10 carbon atoms and $n$ is at least 2. In the most preferred embodiment of the invention R' and R'' contain up to 4 carbon atoms and $n$ is 2 to 6. The preparation of the thiol acid esters is well known and forms no part of the present invention. They are generally prepared by the esterification of thiol acids with polyfunctional alcohols.

Representative hydrocarbon polymercaptans which can be used in the invention are 1,4-dimercapto butane; 1,3,5-trimercapto pentane; pentaerythritol tetramercaptan; 1,20-dimercapto eicosane; 1,4-dimercapto cyclohexane; 1,4-dimercapto benzene; 2,4,6 trimercapto toluene; 1,4,5,8-tetramercapto naphthalene, etc.

Representative thiol acid esters which can be used in the invention include trimethylolpropane-tri(thiolacetate)-dipentaerythritol-hexa(3-thiopropionate), ethylene glycol-di(thiolacetate), trimethylolethane-tri(4-thiobutyrate)-xylenol di(4-thiobenzoate)sorbitol-hexa(thiolacetate), tri-methylolpropane-tri(thiolbenzoate), ethylene glycol-di(3-thionaphthenate), etc. The preferred compounds are the saturated aliphatic thio esters such as trimethylol propane-tri(thiolacetate) and pentaerythritol-tetra(thiolacetate).

The organic polythiol compounds are effective in amounts of about 0.1% to about 20%, based on the total weight of ethylene-carbon monoxide copolymer in the composition. The preferred concentration of polythiol compound in the composition is about 1 to 10% based on the total weight of ethylene-carbon monoxide present in the composition.

The organic polythiol compounds may be used in combination with other stabilizers or antioxidants if desired. The amount of other stabilizer or antioxidant used in the composition may vary over the same range as the polythiol compounds i.e., about 0.1 to 20% and preferably about 1 to 10% based on the weight of ethylene-carbon monoxide in the polymeric composition.

The stabilizer or mixture of stabilizers can be incorporated into the compositions by any of the known methods. For instance, they may be incorporated into the polymerization mixture prior to or during the polymerization. This method has the advantage of stabilizing the polymer from the time it is formed. The stabilizers can also be incorporated into the polymer after the polymerization is completed. This is most conveniently accomplished by blending the stabilizer into the copolymer which is usually in the form of a melt or fine particles. The stabilizer may be incorporated into the copolymer composition in the form of a powder or dissolved in a solvent. The method of incorporating the stabilizers into the copolymer composition is not considered to be critical.

Other additives such as fillers, extenders, plasticizers, coloring agents, other polymeric materials, etc. can be added to the copolymer compositions being stabilized. These are usually most conveniently added to the polymer after the polymerization.

The following examples illustrate specific examples of the invention. Unless otherwise indicated, parts and percentages are on a weight basis.

EXAMPLE I

A sample ethylene-carbon monoxide copolymer containing 47.11% by weight carbon monoxide is placed on a Fisher-Johns melting point block set at 250°C. and the melting is observed. After 5 minutes the melted polymer is examined and observed to have a dark orange color and exhibit gelling and surface skin formation.

EXAMPLE II

A sample of the same ethylene-carbon monoxide copolymer used in Example I is ground with 2.0% based on the weight of copolymer of trimethylol propane-tri(thioacetate) and placed on a Fisher-Johns melting point block set at 250°C. and the melting observed. After 5 minutes the melted polymer is examined and observed to have a light yellow color and no gelling or surface skin formation.

Example II illustrates the improved color stability and gel and skin formation resistance obtained when trimethylol propane-tri(thioacetate) is blended into an ethylene-carbon monoxide copolymer. Example I is a stabilizer-free control.

EXAMPLE III

The procedure of Example II is repeated except that the trimethylol propane-tri(thioacetate) is replaced by pentaerythritol-tetramercaptan. The resulting product will exhibit improved color stability and gel and skin formation resistance.

Although the invention is described with particular reference to specific embodiments, the scope of the invention is not limited thereto but is defined by the breadth of the appended claims.

I claim:

1. A stabilized ethylene-carbon monoxide copolymer composition containing about 0.1 to 20% based on the weight of polymer in the base composition of a stabilizer compound having the structural formula

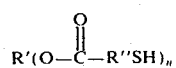

wherein R' and R'' are hydrocarbon radicals and $n$ is at least 2.

2. The composition of claim 1 wherein said stabilizer compound is present in an amount of about 6 to 10% based on the weight of polymer in the composition.

3. The composition of claim 1 wherein R' and R'' each contain up to 10 carbon atoms.

4. The composition of claim 1 wherein R' is a saturated hydrocarbon radical containing 2 to 10 carbon atoms, R'' is a saturated hydrocarbon radical containing up to 10 carbon atoms and $n$ is 2 to 6.

5. The composition of claim 4 wherein R'' is an alkylene group and R' and R'' contain up to 4 carbon atoms.

6. A stabilized ethylene-carbon monoxide copolymer composition containing about 1 to 10% of trimethylol propane-tri(thiolacetate) or pentaerythritol tetramercaptan.

7. A stabilized ethylene-carbon monoxide copolymer composition containing about 0.1 to 20% based on the weight of polymer in the base composition of a stabilizer compound having the structural formula

wherein R is a hydrocarbon radical containing up to 30 carbon atoms and is free of substituents which adversely affect the properties of the copolymer composition and $n$ is at least 2.

8. The composition of claim 7 wherein said stabilizer compound is present in an amount of about 1 to 10% based on the weight of polymer in the composition.

9. The composition of claim 7 wherein R contains up to 18 carbon atoms.

10. The composition of claim 7 wherein R is a saturated hydrocarbon radical containing 2 to 10 carbon atoms and $n$ is 2 to 6.

* * * * *